United States Patent
Quan

(10) Patent No.: US 8,094,818 B2
(45) Date of Patent: Jan. 10, 2012

(54) METHOD TO SYNTHESIZE VIDEO COPY PROTECTION SIGNALS

(75) Inventor: Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1941 days.

(21) Appl. No.: 10/970,895

(22) Filed: Feb. 9, 2005

(65) Prior Publication Data

US 2005/0117749 A1  Jun. 2, 2005

Related U.S. Application Data

(62) Division of application No. 09/388,296, filed on Sep. 1, 1999, now Pat. No. 6,836,549.

(51) Int. Cl.
- *H04N 7/167* (2006.01)
- *H04N 7/16* (2006.01)
- *H04L 29/06* (2006.01)
- *H04N 7/24* (2006.01)

(52) U.S. Cl. ........ 380/221; 380/206; 380/209; 380/210; 726/26; 713/163; 713/164; 713/167; 725/25; 725/31; 348/471

(58) Field of Classification Search .................. 380/221, 380/206, 209, 210; 726/26; 713/163, 164, 713/167; 725/25, 31; 348/471

See application file for complete search history.

(56) References Cited

U.S. PATENT DOCUMENTS

| | | | |
|---|---|---|---|
| 4,163,253 A | 7/1979 | Morio et al. | |
| 4,336,554 A | 6/1982 | Okada et al. | |
| 4,631,603 A | 12/1986 | Ryan | |
| 4,695,901 A | 9/1987 | Ryan | |
| 4,697,211 A | 9/1987 | Balaban et al. | |
| 4,698,679 A | 10/1987 | Balaban et al. | |
| 4,819,098 A | 4/1989 | Ryan | |
| 4,888,649 A | 12/1989 | Kagota | |
| 4,907,093 A | 3/1990 | Ryan | |
| 4,933,774 A | 6/1990 | Ishimaru | |

(Continued)

FOREIGN PATENT DOCUMENTS

PL  304477  2/1996

(Continued)

OTHER PUBLICATIONS

EP Search Report for EP04018856.7 dated Sep. 28, 2004 (1 page).

(Continued)

*Primary Examiner* — Aravind K Moorthy
(74) *Attorney, Agent, or Firm* — George B. Almeida

(57) ABSTRACT

A method and apparatus for defeating copy protection signals in a video signal, and also for providing copy protection signals for a video signal, is disclosed. The defeat technique generally utilizes a particular pulse position shifting, modulation, etc., of AGC, normal sync and/or pseudo sync pulses to increase the separation between the pulses. Various embodiments are disclosed including selective shifting of the relative positions of either the sync/pseudo sync or AGC pulses, trimming portions of the sync/pseudo sync and/or the AGC pulses and narrowing of either the sync/pseudo sync and/or the AGC pulses, all to provide the selective position separation between the sync/pseudo sync and AGC pulses. The copy protection technique includes various embodiments for dynamically varying the sync/pseudo sync and AGC pulse separation by applying a modulation of the above position shifting, trimming and/or narrowing techniques over selected time periods to cycle from the copy protection condition to the copy protection defeat condition, back to the copy protection condition.

4 Claims, 13 Drawing Sheets

U.S. PATENT DOCUMENTS

| | | | |
|---|---|---|---|
| 5,155,767 A | 10/1992 | Noller | |
| 5,157,510 A | 10/1992 | Quan | |
| 5,194,965 A | 3/1993 | Quan et al. | |
| 5,305,109 A | 4/1994 | Harford | |
| 5,339,114 A * | 8/1994 | Lagoni et al. | 348/673 |
| 5,394,470 A * | 2/1995 | Buynak et al. | 380/204 |
| 5,402,488 A | 3/1995 | Karlock | |
| 5,410,364 A | 4/1995 | Karlock | |
| 5,418,835 A | 5/1995 | Frohman et al. | |
| 5,583,936 A | 12/1996 | Wonfor et al. | |
| 5,625,691 A | 4/1997 | Quan | |
| 5,633,927 A | 5/1997 | Ryan et al. | |
| 5,661,801 A | 8/1997 | Sperber | |
| 5,748,733 A | 5/1998 | Quan | |
| 5,815,630 A | 9/1998 | Sato | |
| 5,864,591 A | 1/1999 | Holcombe | |
| 5,907,655 A | 5/1999 | Oguro | |
| 5,953,417 A | 9/1999 | Quan | |
| 6,041,158 A | 3/2000 | Sato | |
| 6,058,191 A | 5/2000 | Quan | |
| 6,173,109 B1 | 1/2001 | Quan | |
| 6,188,832 B1 | 2/2001 | Ryan | |
| 6,191,725 B1 | 2/2001 | Lavoie | |
| 6,295,360 B1 | 9/2001 | Ryan et al. | |
| 6,404,889 B1 | 6/2002 | Ryan et al. | |
| 6,459,795 B1 | 10/2002 | Quan | |
| 2001/0026617 A1 * | 10/2001 | Wonfor et al. | 380/203 |
| 2001/0038422 A1 * | 11/2001 | Yamada et al. | 348/478 |
| 2004/0047469 A1 * | 3/2004 | Ryan et al. | 380/210 |

FOREIGN PATENT DOCUMENTS

| | | |
|---|---|---|
| RU | 2007052 | 1/1994 |
| RU | 2014746 | 6/1994 |
| WO | WO 97/15142 A | 4/1997 |
| WO | WO 97/16022 | 5/1997 |
| WO | WO 00/13413 | 3/2000 |

OTHER PUBLICATIONS

Barr, David A., Copy Protection for High-Definition Baseband Video, 2000, IEEE, pp. 174-177.

Qiao, Lintian, et al., Watermarking Methods For MPEG Encoded Video : Towards Resolving Rightful Ownership, 1998, IEEE, pp. 276-285.

Takiff, Jonathan, Macrovision Hopes It Has Out-Pirated Video-Tape Pirates, 1988, Chicago Tribune, p. 83.

Traw, C. Brendan S., Technical Challenges of Protecting Digital Entertainment Content, 2003, IEEE, pp. 72-78.

* cited by examiner

FIG. 5a  COPY PROTECTED VIDEO (PRIOR ART)
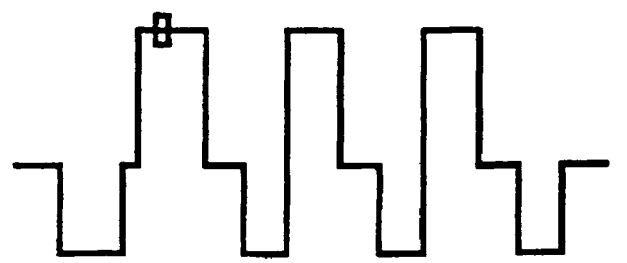
FIG. 5b  DELAY LINE 50
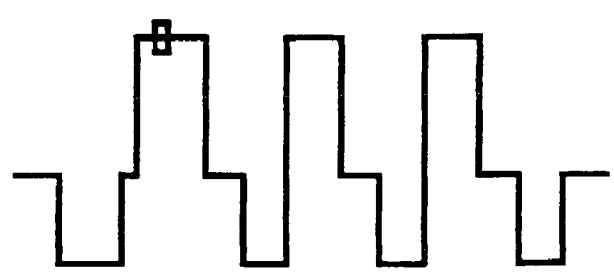
FIG. 5c  BLACK LEVEL CLIPPER 56
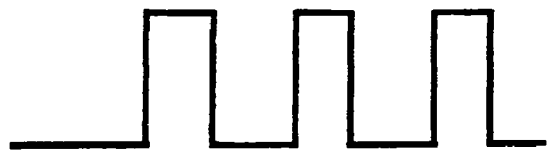
FIG. 5d  AGCLL
FIG. 5e  VIDEO WITHOUT COPY PROTECTION
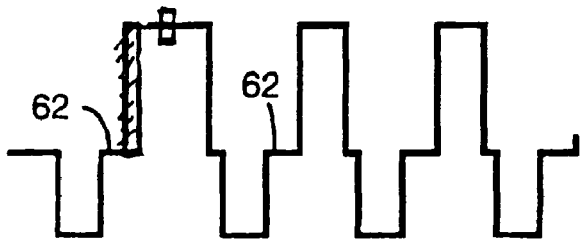

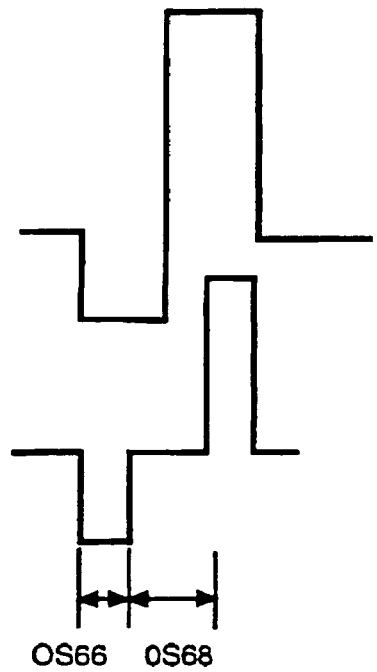
FIG. 6a
(PRIOR ART)
FIG. 6b
OS66  OS68
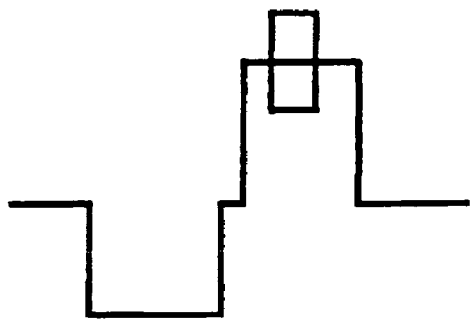
FIG. 6c
(PRIOR ART)
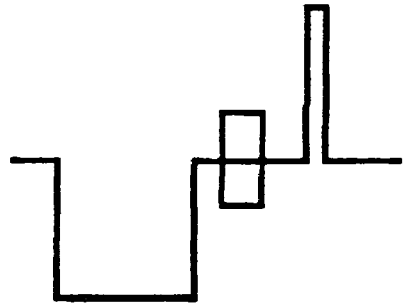
FIG. 6d
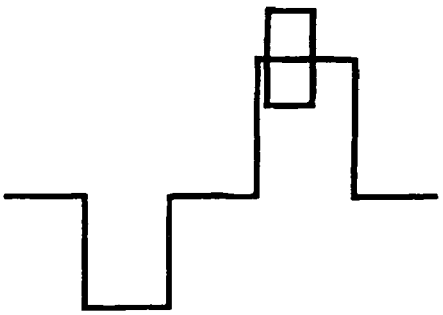
FIG. 6e

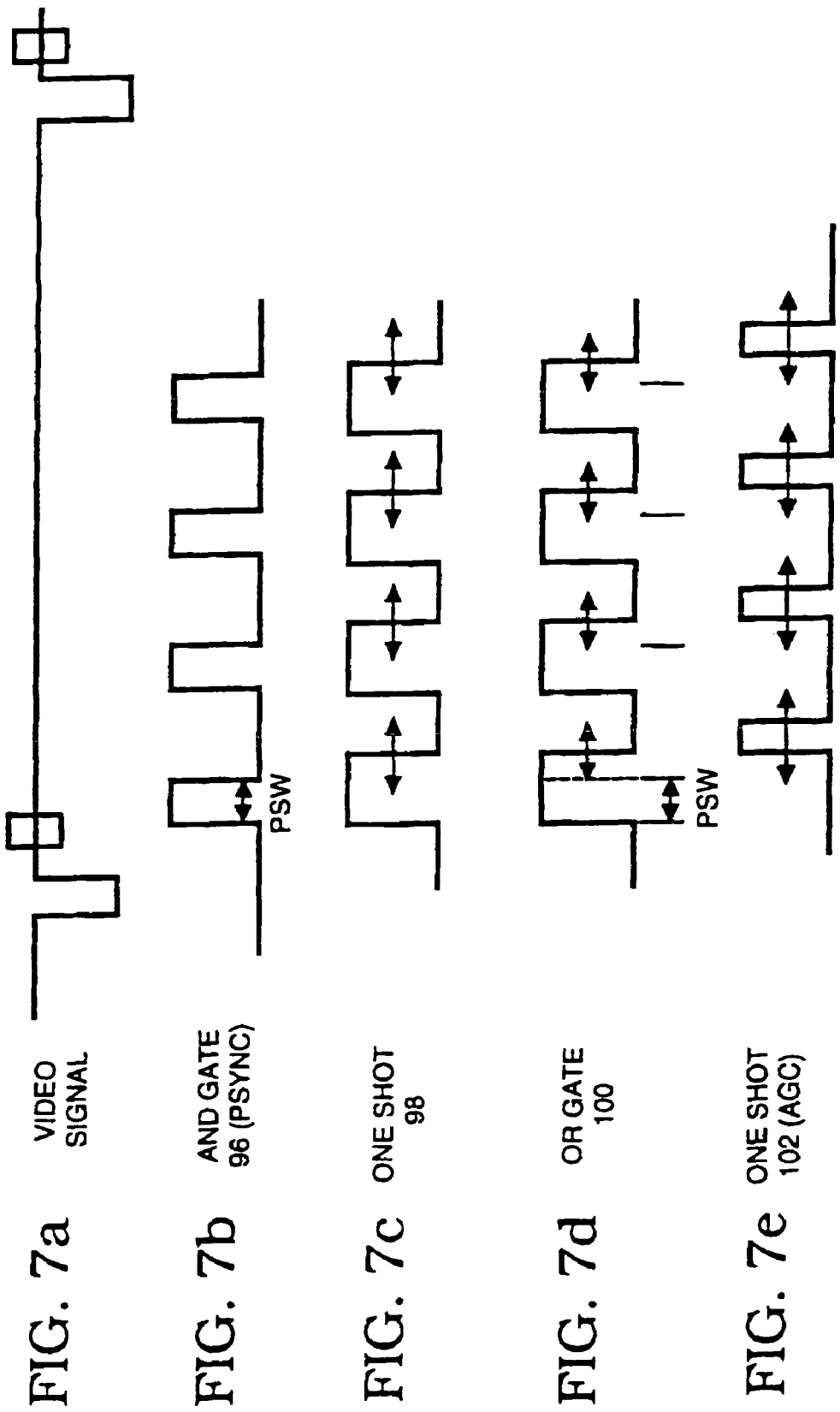

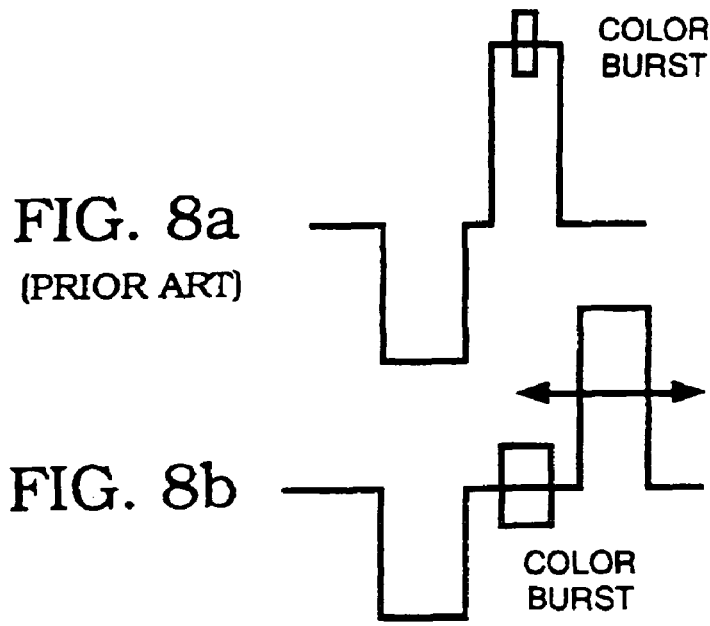
FIG. 8a (PRIOR ART)
FIG. 8b
FIG. 9a  PRIOR ART COPY PROTECTION
FIG. 9b  PULSE PAIRS REVERSED IN ORDER
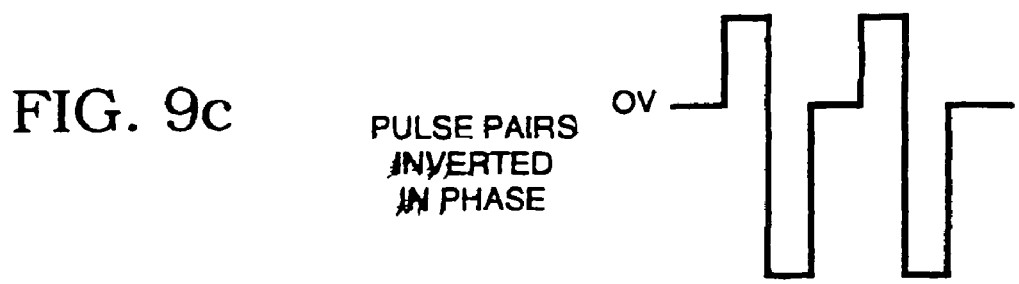
FIG. 9c  PULSE PAIRS INVERTED IN PHASE

METHOD TO SYNTHESIZE VIDEO COPY PROTECTION SIGNALS

CROSS REFERENCE TO RELATED APPLICATIONS

The present application is a divisional application of U.S. patent application Ser. No. 09/388,296, filed Sep. 1, 1999 now U.S. Pat. No. 6,836,549.

This invention is related to commonly owned U.S. Pat. No. 4,631,603 entitled "METHOD AND APPARATUS FOR PROCESSING A VIDEO SIGNAL SO AS TO BE ABLE TO PROHIBIT THE MAKING OF ACCEPTABLE VIDEO TAPE RECORDINGS THEREOF" which issued on Dec. 12, 1986; to U.S. Pat. No. 4,695,901 entitled "METHOD AND APPARATUS FOR REMOVING PSEUDO-SYNC PULSES AND/OR AGC PULSES FROM A VIDEO SIGNAL" which issued on Sep. 22, 1987; to U.S. Pat. No. 4,907,093 for METHOD AND APPARATUS FOR PREVENTING THE COPYING OF A VIDEO PROGRAM" which issued Mar. 6, 1990; to U.S. Pat. No. 4,819,098 for "METHOD AND APPARATUS FOR CLUSTERING MODIFICATIONS MADE TO A VIDEO SIGNAL TO INHIBIT THE MAKING OF ACCEPTABLE VIDEO TAPE RECORDINGS" which issued on Apr. 4, 1989; to U.S. Pat. No. 5,157,510 for "METHOD AND APPARATUS FOR DISABLING ANTI-COPY PROTECTION SYSTEM IN VIDEO SIGNALS USING PULSE NARROWING which issued on Oct. 20, 1992; to U.S. Pat. No. 5,194,965 for "METHOD AND APPARATUS FOR DISABLING ANTI-COPY PROTECTION SYSTEM IN VIDEO SIGNALS" issued on Mar. 16, 1993; to U.S. Pat. No. 5,625,691 for "METHOD AND APPARATUS TO DEFEAT CERTAIN COPY PROTECTION PULSES WITHIN A VIDEO SIGNAL" issued on Apr. 29, 1997; to U.S. Pat. No. 5,633,927 for "VIDEO COPY PROTECTION PROCESS ENHANCEMENT TO INTRODUCE HORIZONTAL AND VERTICAL PICTURE DISTORTIONS" issued on May 27, 1997; to U.S. Pat. No. 5,748,733 for "METHOD AND APPARATUS TO REDUCE EFFECTS OF CERTAIN COPY PROTECTION PULSES WITHIN A VIDEO SIGNAL" issued on May 5, 1998; to U.S. Pat. No. 5,661,801 for "METHOD AND APPARATUS FOR STABILIZING AND BRIGHTENING PRERECORDED TV SIGNALS ENCODED WITH COPY PROTECTION" issued on Aug. 26, 1997; to U.S. Pat. No. 4,336,554 for "CODE SIGNAL BLANKING APPARATUS" issued on Jun. 22, 1982 and to U.S. Pat. No. 5,583,936 for "VIDEO COPY PROTECTION PROCESS ENHANCEMENT TO INTRODUCE HORIZONTAL AND VERTICAL PICTURE DISTORTIONS" issued on Dec. 10, 1996. All of the above are incorporated by reference.

Also related is U.S. Pat. No. 4,163,253 for "METHOD APPARATUS FOR MODIFYING A VIDEO SIGNAL TO PREVENT UNAUTHORIZED RECORDING AND REPRODUCTION THEREOF" issued on Jul. 31, 1979.

BACKGROUND OF INVENTION

1. Field of the Invention

The field of the invention is in the mechanisms and/or methods for defeating, removing, or reducing the effects of the video copy protection signals. These mechanisms are also used to synthesize and improve the performance of a video copy protection signal.

2. Description of the Prior Art

The Hollywood movie industry is very concerned about the unauthorized copying of movies and programs. As an example, on Sep. 17, 1997 Jack Valenti, President and Chief Executive Office of the Motion Picture Association of America stated "If you can't protect what you own—You don't own anything." The U.S. Pat. No. 4,631,603, by Ryan, incorporated by reference, discloses a way to process an ordinary program video source to have copy protection. The copy protected video is viewable on a TV set but it produces a recording lacking any entertainment value. That is, the video programs that are not recordable suffer from artifacts ranging from low contrast to synchronizing problems. The '603 patent describes a method for "confusing" or causing misoperation of the AGC system in a videocassette recorder while not causing a black depression problem in a television receiver displaying the copy protected signal.

A Polish Patent Application (PL 304477 ('477)) by Tomasz Urbaniec entitled "Method and Device for Protecting Videophonic Recordings Against Unauthorized Copying" filed Jul. 28, 1994, hereby incorporated by reference, discloses a variation of the '603 patent by Ryan. FIG. 1a of the '603 patent describes the waveform of the copy protected video signal as disclosed by Ryan and is replicated herein as FIG. 1a. FIG. 4 of the Urbaniec patent '477 describes the comparative waveform as disclosed by Urbaniec, which is replicated herein as FIG. 1(b).

As is well known in the art, the videocassette system has a limited luminance frequency response, less than 2 MHz. A signal as described by Ryan recorded on a videocassette duplicating recorder with the AGC turned off (to avoid the effects of copy protection) will produce a video signal with pulse shapes modified by the limited frequency response of the duplicating recorder. Since there is no gap between the pseudo sync pulses and the AGC pulses of Ryan, the AGC system of a home duplicating recorder will respond to the combination of the pseudo sync pulses and the AGC pulses.

The limited bandwidth of the recording VCR responds slightly differently to the combination of pseudo-sync and AGC pulses separated by a time gap of 0.5 μseconds to 2.0 μseconds. If the time gap is as low as 0.5 μseconds, the limited bandwidth of the recording videocassette recorder distorts the time gap to effectively remove it and the effectiveness of the copy protection is essentially the same as that achieved by Ryan. As the gap widens, the effectiveness of the copy protection is reduced or removed.

To defeat the copy protection process, there are a number of known ways such as attenuating, blanking, narrowing, level shifting, modifying and/or clipping the copy protection pulses as described in U.S. Pat. Nos. 4,695,901 ('901), 4,336,554 ('554), 5,157,510 ('510), 5,194,965 ('965), 5,583,936 ('936), 5,633,927 ('927), 5,748,733 ('733) and 5,661,801 ('801) cited above and hereby incorporated by reference.

In the patents mentioned above, the AGC and/or sync or pseudo sync pulses (see U.S. Pat. No. 4,695,901) are changed in amplitude, changed in level relative to normal sync pulses, and/or changed in pulse width, so as to allow a satisfactory recording.

In particular, U.S. Pat. Nos. 5,194,965 and 5,157,510 disclose narrowing of the AGC and/or pseudo sync pulses so that the record VCR does not sense these narrowed added pulses and thus, makes a satisfactory copy.

SUMMARY OF THE INVENTION

To defeat the anti-copy signal, the present invention discloses a method and apparatus utilizing pulse position and pulse width modulation of the AGC and/or sync or pseudo sync pulses. The invention also discloses the insertion of a sufficiently wide time gap between the AGC and/or pseudo sync pulses such that the record VCR will respond to or sense the sync or pseudo sync pulses but still will allow for a recordable copy.

The copy protection defeating mechanisms of this invention can also be used in combination with any of the defeat inventions mentioned above. For example, to defeat the copy protection process, one can shift (delay) the AGC pulse by about 1.5 μseconds away from the preceding pseudo sync pulse and then trim the trailing edge of the preceding pseudo sync pulse by 0.6 μsecond. Thus a gap of about 2.1 μseconds exists between the trailing edge of the trimmed pseudo sync pulse and the leading edge of the delayed AGC pulse. If this gap is, for example, near blanking level for 2.1 μseconds, then the VCR will sample the voltage in the gap instead of the added AGC pulses for its AGC amplifier. By sampling this gap voltage near blanking level, the copy protection signal is then nullified. Alternatively, the gap voltage level may be set above or below blanking level. It is important to note that by simply delaying or shifting the position of the leading edge of the AGC pulse relative to the trailing edge of the pseudo sync pulse, the gap between the pseudo sync pulses and the AGC pulses will nullify or partially nullify the effects of the AGC copy protection signal. It is also possible to create this gap in other ways such as moving the trailing edge of pseudo sync pulse away from the leading edge of the upcoming AGC pulse, or some combination of moving the position of both the AGC pulse and pseudo sync pulse to form a gap that would defeat the copy protection process. Typical gap durations of 1.5 μseconds or more have proved effective in defeating the copy protection signal. Compounding the narrowing of the pseudo sync pulses and/or AGC pulses with this gap further enhances defeating the copy protection signal.

It should be noted that the defeat method as described above can be varied and then used as a copy protection signal. By dynamically varying the gap from zero to greater than 1.5 μseconds between the trailing edge of the pseudo sync pulse relative to the leading edge of the upcoming AGC pulse, a new copy protection signal is made to effectively mimic the Ryan '603 patent with amplitude modulated AGC pulses. By varying the gap via position modulation of the pseudo sync pulses relative to the AGC pulse or vice versa, or dynamically narrowing or changing the pulse width of the added pulses (AGC pulse and/or sync or pseudo sync pulse), an easier copy protection implementation is possible in the digital domain and/or analog domain. Today's digital domain is the format of choice for implementing copy protection in cable systems and the like (i.e. digital versatile disc players). The range of pulse widths can be for example, between about 50% to 100% of the normal pulse widths (i.e. the pseudo sync pulse normal widths are about 2.3 μseconds and the AGC normal widths are about 2.3 μseconds to 3 μseconds depending on how many added pulses are in a television (TV) line).

In general the copy protection process of the invention may start having the added pulse pairs as for example in FIG. 2(a) of Ryan '603 patent, where the AGC pulse and/or pseudo sync pulse are position separated relative to time. If the gap due to position separation is insufficient to "turn off" the copy protection process (i.e. position modulation amounts to only 1.0 μsecond of gap), then the AGC pulse and/or pseudo sync pulse can be narrowed as a function of time to increase the gap sufficiently (i.e. slowly trim or narrow the AGC pulse and/or pseudo sync pulse by about 0.35 μsecond each, which would add another 0.7 μsecond to the 1.0 μsecond gap for a increased gap duration of 1.7 μseconds). After the gap has been extended as to "defeat" or turn off the copy protection signal, then the new copy protection signal is reactivated by reducing the separation (for example, to zero) between the AGC pulse and pseudo sync pulse and by restoring the pulse widths of the (trimmed or narrowed) AGC pulses and/or pseudo sync pulse to their full normal pulse widths.

The method of using relative position modulation between the sync and AGC pulses for defeating and/or synthesizing a copy protection signal can be applied to the copy protection pulses within or around a horizontal blanking interval. The method can also be combined with narrowing any portion of the added pulses.

In order to produce a further effective copy protection signal, a variation of the U.S. Pat. No. 4,631,603 has been developed. To this end, the AGC pulses also are amplitude modulated from full amplitude to zero and vice versa over the period of for example about 20 to 30 seconds. As a result, the illegal copy will have constantly changing brightness levels. This causes more annoyance when compared to a constant dim picture (when the AGC pulses are static and at full amplitude).

BRIEF DESCRIPTION OF THE DRAWINGS

FIG. 2 also shows a way of dynamically shifting the position of the AGC pulse to provide the copy protection process of the invention;

FIG. 3 also shows a way of dynamically shifting the position and then narrowing the AGC pulses in accordance with the copy protection process of the invention;

FIGS. 5a to 5e illustrate the waveforms generated at various points in the circuit of FIG. 5;

FIGS. 6a to 6E illustrate several waveforms related or generated by the circuit of FIG. 6 given typical copy protection signals as an input;

FIGS. 7a to 7e illustrate the relevant waveforms that are generated at various points in the circuit of FIG. 7;

FIGS. 8a and 8b illustrate position delay or modulation of the raised back porches as mentioned in '098 which can be used as a defeat process or as a copy protection signal. By varying the gap between the trailing edge of (horizontal) normal sync pulses and their raised back porch AGC pulses, the VCR will respond to these as if the raised back porch AGC pulses are being amplitude modulated up and down, which results in yet another dynamic copy protection process of the invention;

FIG. 9a illustrates a prior art copy protection signal. FIG. 9b illustrates a defeating or modifying method by reversing at least portions of the pseudo sync and/or AGC pulses. FIG. 9c illustrates another method for defeating or modifying the original process (FIG. 9a for example) by phase shifting (i.e., inverting) portions of the pseudo syncs and/or AGC pulses;

DESCRIPTION OF THE PREFERRED EMBODIMENTS

Figure 1A:
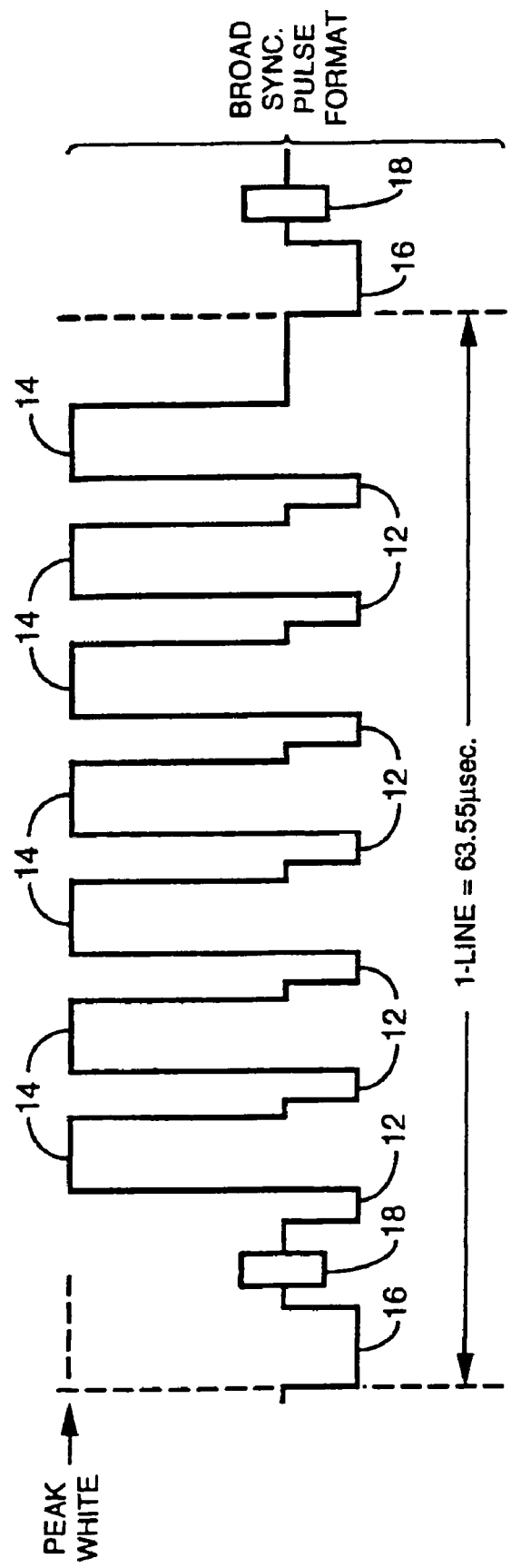
FIG. 1a illustrates a the basic anticopy process consisting of AGC and pseudo sync pulses.
Figure 1B:
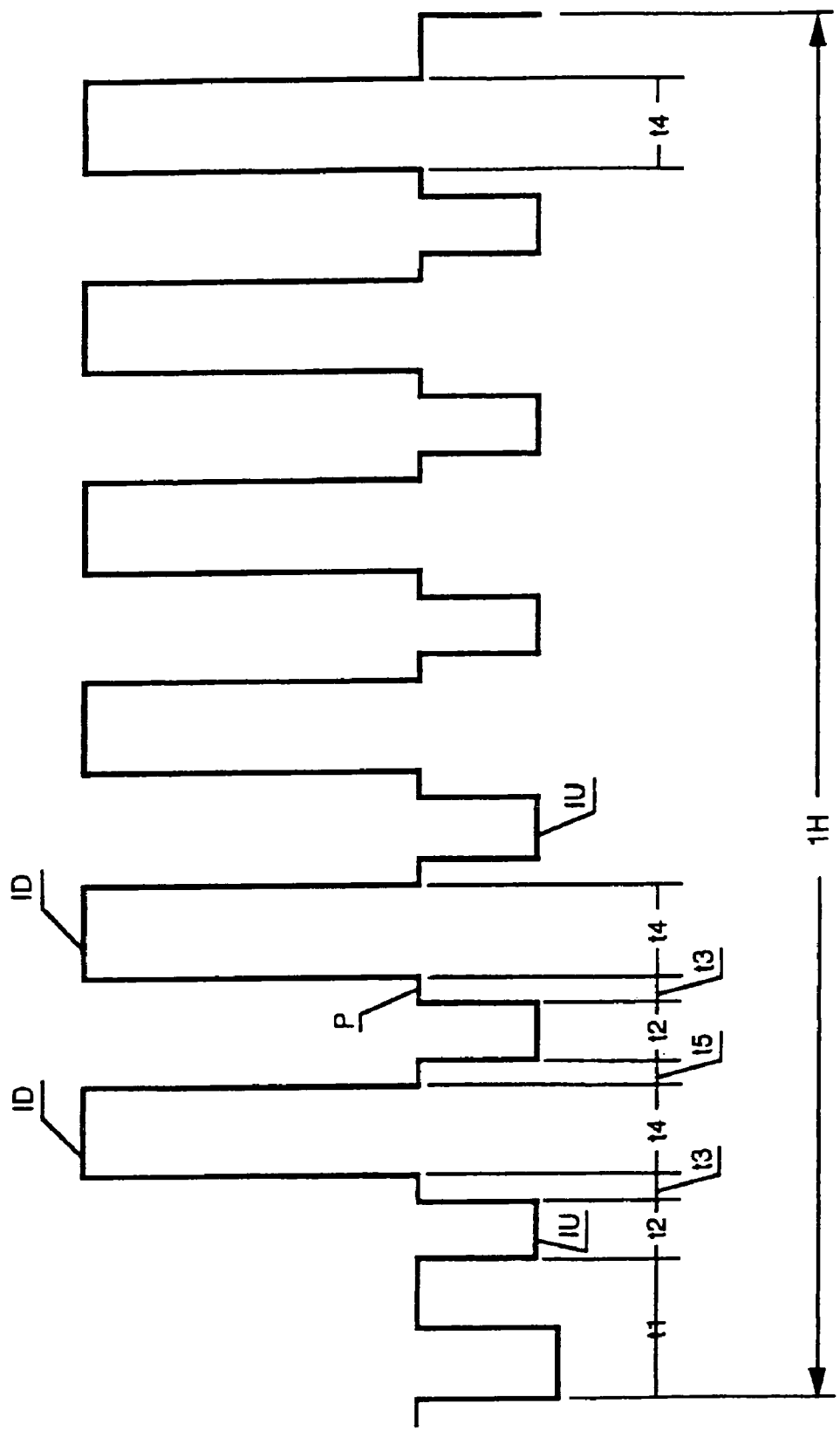
FIG. 1b illustrates the Urbaniec modification to the basic anticopy process consisting of AGC and pseudo sync pulses.

As previously discussed, FIGS. 1a and 1b illustrate prior art copy protection and copy protection defeating signals, respectively.

Figure 2:
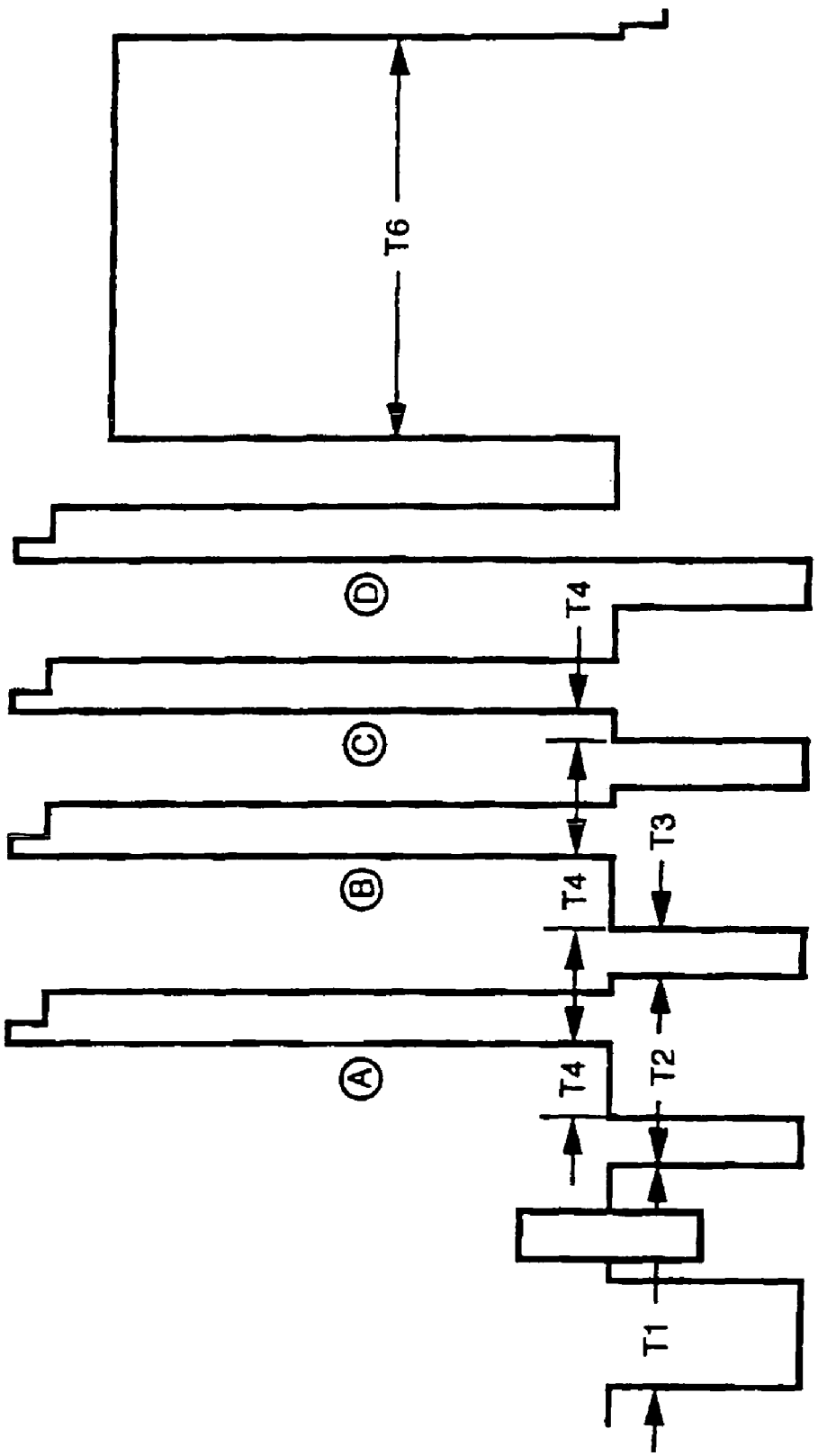
FIG. 2 illustrates various ways to position shift the AGC pulse to defeat the copy protection signal.

FIG. 2 illustrates various waveforms corresponding to ways that AGC pulses can be delayed to provide the copy protection defeating technique of the invention. First, the waveform D in FIG. 2 illustrates the AGC pulse and pseudo sync pulse at the normal position previously shown in FIG. 1a which causes copy protection. Waveforms A to C show various delays or gaps between the trailing edge of pseudo sync pulse and the leading edge of the respective AGC pulse. Waveforms A and B are effective in turning off the copy protection signal while waveform C causes partial reduction or turn off of the copy protection signal. For effective defeat of the copy protection signal it follows that waveforms A and B are preferable.

For a new copy protection signal that is dynamically varied from on to off, one technique of the invention starts for example, with several seconds of the waveform D of FIG. 2 (copy protection on) then transitions to the waveform C of FIG. 2 (copy protection partially on) and then transitions to the waveform B of the FIG. 2 (copy protection turned off). The gap, or separation T4, in FIG. 2 is preferably continuously or discretely changing from zero to greater than about 1.5 μseconds. Waveform A is used to turn off copy protection.

In FIG. 2 (as well as FIGS. 3, 4) the time interval T1 defines the normal sync to the first pseudo sync pulse period, T2 defines the repetition rate of added pseudo sync pulses, T3 defines the pseudo sync pulses' width and T4 defines the gap duration. T6 designates the width of a white reference pulse which may be included as an option.

Figure 3:
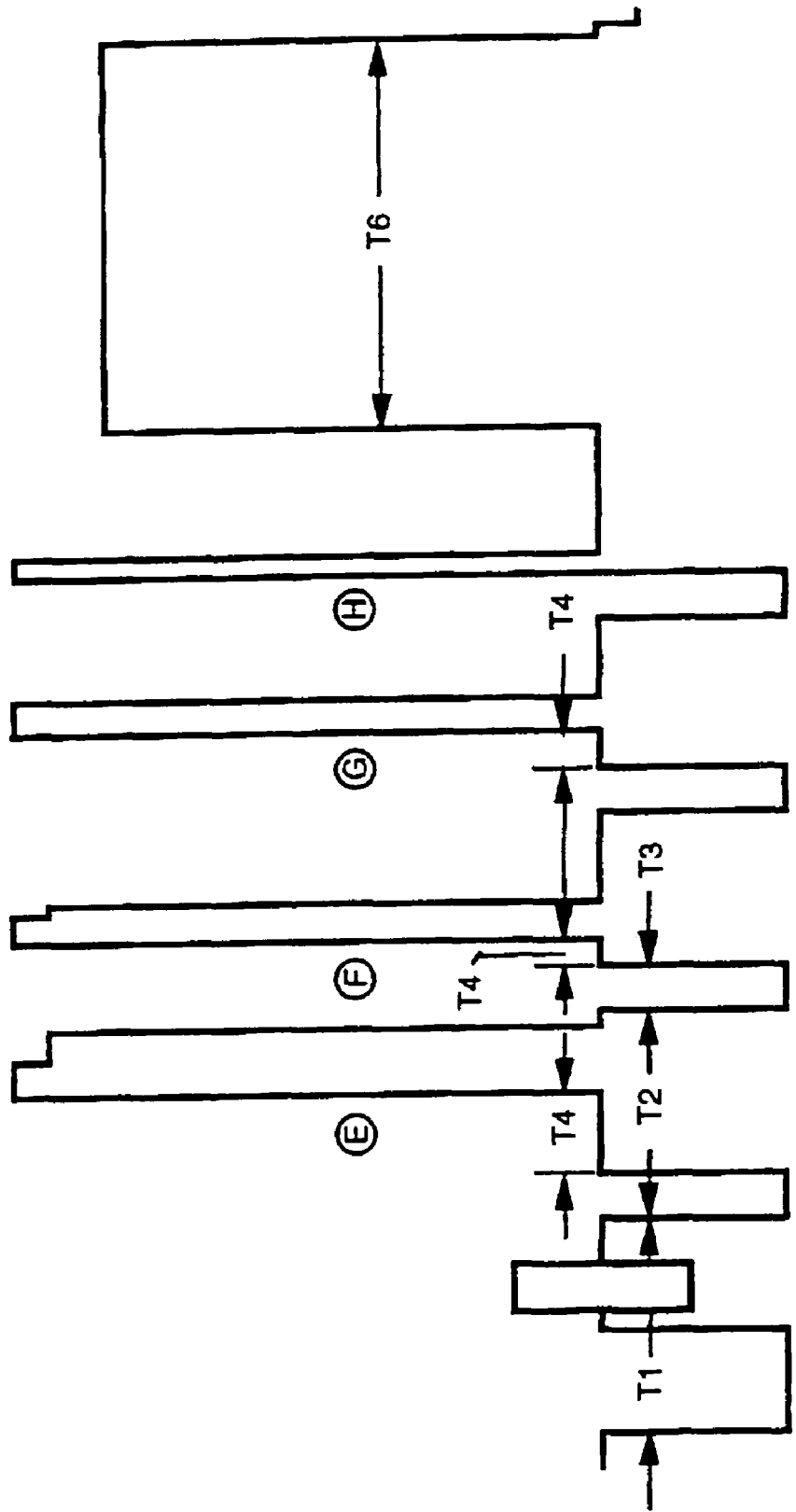
FIG. 3 illustrates a combination of position shifting and narrowing (trimming) the AGC pulses to defeat the copy protection signal.

FIG. 3 illustrates a variation of the embodiment of FIG. 2 with AGC pulse narrowing, although the pseudo sync pulses can be narrowed as well. In the waveform H of FIG. 3, the pulse resembles a narrowed AGC pulse in the U.S. Pat. Nos. '510 and '965 of previous mention. While waveform H of FIG. 3 can be used for defeating copy protection signals, it can again also be used as part of a copy protection signal. The waveform D of FIG. 2 represents a normal copy protection signal which can transition to the waveform H of FIG. 3, a signal with a narrowed AGC pulse, and then transition to waveform F of FIG. 3, a signal with a gap and narrowed AGC pulse. Finally the copy protection signal can be turned off by a transition to the waveform G of FIG. 3, where the gap is larger with a narrowed AGC pulse. Waveform E of FIG. 3 is equivalent to waveform A of FIG. 2 and is used to defeat copy protection.

Figure 4:
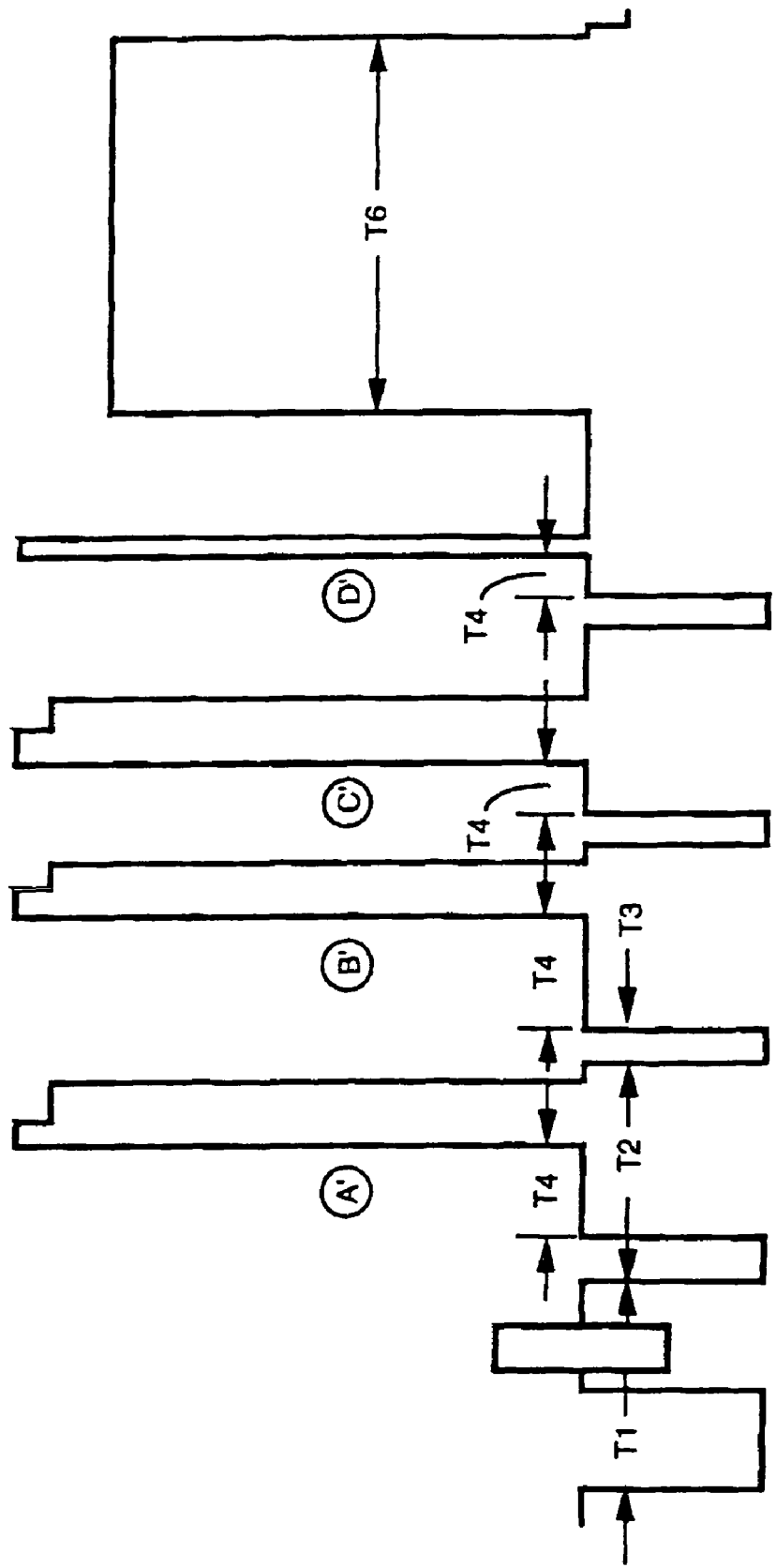
FIG. 4 illustrates various ways to shift the relative position between AGC pulses and pseudo sync pulses while narrowing pseudo sync and/or AGC pulses to defeat the copy protection signal. If the positional shifting and narrowing of AGC pulses and/or pseudo sync pulses is done from zero to maximum, then this technique can be used as the copy protection signal of the invention.

FIG. 4 illustrates pseudo sync pulse narrowing combined with position delay or modulation of varying pulse widths of the AGC pulses to defeat the copy protection process, or form a dynamic copy protection signal.

The waveform D' of FIG. 4 illustrates a defeat process not illustrated in the patents of previous mention by Quan et al '510 and '965. In waveform D' of FIG. 4 the pseudo sync pulse's trailing edge is advanced to provide a narrowed pseudo sync followed by a delayed AGC pulse leading edge to provide a narrowed AGC pulse. The waveform C' of FIG. 4 illustrates a further gap increase in duration between the AGC pulse by position delaying the AGC pulse using an advanced trailing edge to narrow the pseudo sync pulse. The waveform B' of FIG. 4 illustrates a combination of position separation between the AGC pulse and the pseudo sync pulse with narrowed AGC and pseudo sync pulse. Thus, the waveform B' can be used as a method to defeat the copy protection pulses. As may be seen, waveform A' is generally the equivalent of waveforms A and E of FIGS. 2 and 3, respectively, and also may be used to defeat the effects of copy protection signals.

Alternatively, by employing narrowed pseudo sync pulses and/or AGC pulses that are varied in width, FIG. 4 provides a dynamic copy protection signal of the invention based on dynamically changing the gap (separation) and the amount of narrowing on pseudo sync pulses and/or AGC pulses. For example, the embodiment may start with a waveform D as illustrated in FIG. 2 to provide the copy protection process, then provide narrowing of the AGC pulses and/or pseudo sync pulses to achieve partial copy protection via the waveform C' in FIG. 4, and then transition to a signal such as waveform B' in FIG. 4 to turn off the copy protection. The embodiment then reverses the cycle from waveforms B', to C' and back to D to restore the copy protection.

Figure 5:
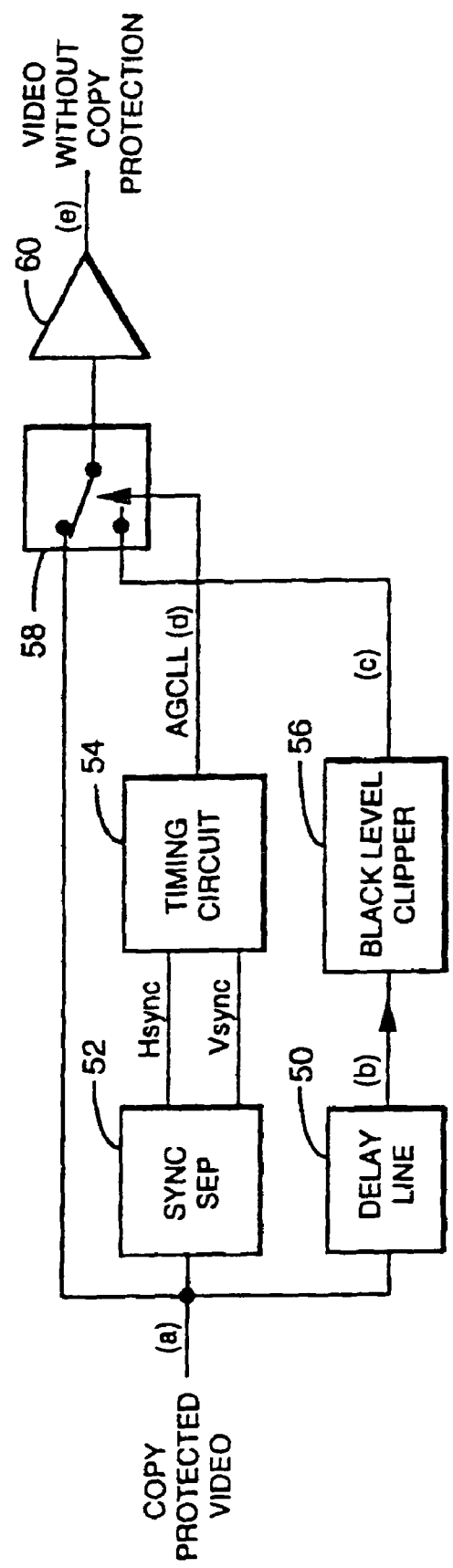
FIG. 5 illustrates a block diagram of an apparatus for defeating a copy protection signal by delaying the AGC pulses.

FIG. 5 is a block diagram depicting an example of circuitry for defeating the copy protection pulses by delaying the AGC pulses relative to the pseudo sync pulses. To this end, copy protected video is inputted as at (a) to a delay line circuit 50, which delays the input video, and also to a sync separator circuit 52. The output of the sync separator circuit provides horizontal and vertical sync pulses to a timing circuit 54 which in turn outputs pulses at (d) coincident with the video lines containing raised back porch AGC pulses and those with AGC pulses. This output signal, AGCLL, is logic high at least from the leading edge of the AGC pulses of the input video signal to the trailing edge of the AGC pulses which appear at an output (b) of the delay line circuit 50 (delayed input video of about 1.5 μseconds or more). A black clipper circuit 56 coupled to the delay line 50 clips off most or all of the sync pulses. Thus, delayed AGC pulses are supplied at the output (c) of the black clipper circuit. By using an electronic switch 58, with control signal AGCLL to switch in the delayed AGC pulses, the copy protection pulses' effects are then defeated or reduced at the output (e) of an amplifier 60.

FIGS. 5a through 5e illustrate the waveforms generated at different locations of FIG. 5 and is generally self-explanatory. For example, in FIG. 5e, the output has a gap, that is, separation 62, corresponding to gap T4 of FIGS. 2-4, long enough between the sync pulses and AGC pulses to allow recordable copies of the video signal. It should be noted that FIG. 5 is just an illustration of an apparatus for producing position delay of AGC pulses to defeat the copy protection signal. It is also possible to design a position delay equivalently by removing substantially the original copy protection signal or parts of it and then regenerating modified pseudo sync pulses and/or AGC pulses. For instance, the incoming copy protection pulses may be removed and then the pseudo sync pulses inserted in advance of the original pseudo sync pulse, with AGC pulses inserted in delayed relation to the original AGC pulses. Thus a gap voltage is produced between the pseudo sync pulses and AGC pulses that allows for a recordable copy.

Figure 6:
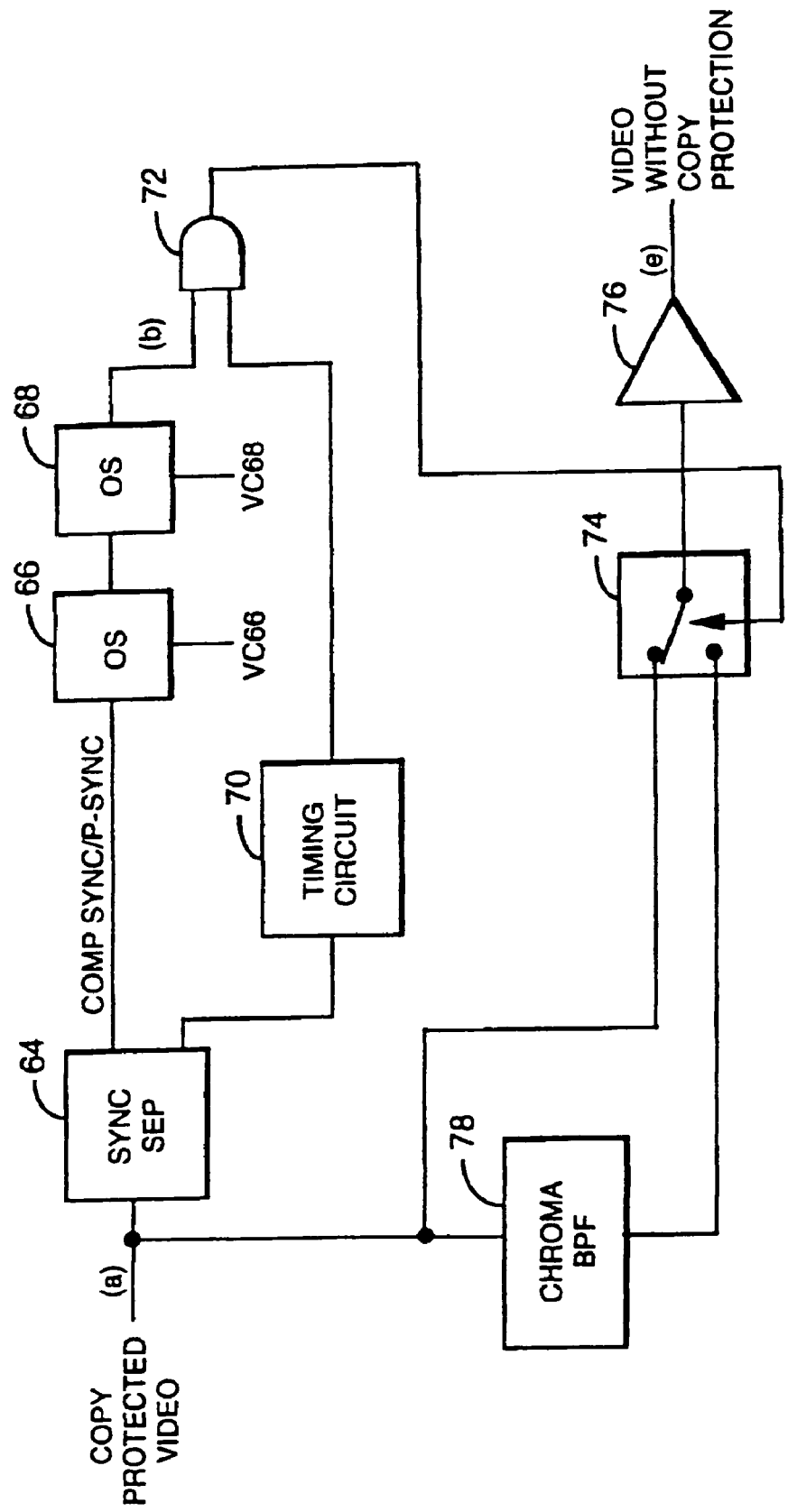
FIG. 6 illustrates an apparatus for defeating a copy protection process by inserting a time gap between the pseudo sync pulses and the AGC pulses.

FIG. 6 is a block diagram depicting circuitry for creating a time gap around blanking level by trimming off (advancing) the trailing edge of sync and delaying the leading edge of the AGC pulse of the copy protection signal, leading to a recordable copy. This "trimming" is a different form of narrowing not illustrated in the U.S. Pat. No. 5,194,965. Copy protected video is fed at (a) to a sync separator 64 to output composite sync including pseudo sync pulses to a one shot (multivibrator) 66. One shot 66 triggers off the leading edge of sync pulses including pseudo sync pulses, and its pulse width can be controlled via a control voltage VC66. The output (b) of one shot 66 is coupled to another one shot 68 whose pulse width is controlled by another control voltage, VC68. The output (b) of one shot 68 is then a pulse coincident with the latter portion of the sync or pseudo sync pulse and the beginning portion of the AGC pulse of the copy protected input video signal. A sync separator output also is fed to a timing circuit 70 which generates pulses coincident with the copy protection signal within the video lines. The output of the timing circuit 70 and of the one shot 68 are fed to an AND gate 72 to control a switch 74 during the times copy protection pulses are present. The switch 74 receives the copy protected video at (a) and supplies a signal containing a gap voltage between the sync and AGC pulses of copy protection signals, whereby the video signal at an output (e) of an output amplifier 76 allows for a recordable copy. FIG. 6 also uses a chroma bandpass filter 78 to generate the gap, but also to reinsert color burst during narrowing of the normal sync and/or raised back porch. As a matter of fact narrowing and/or attenuation and/or level shifting of any kind on the raised back porch AGC pulses and/or its sync signal can result in a recordable copy (see raised back porch AGC signal as in FIG. 3 of U.S. Pat. No. 4,819,098 by Ryan).

FIGS. 6a to 6e show the result of this kind of narrowing. FIG. 6a represents a typical copy protection signal consisting of pseudo sync pulses and AGC pulses. FIG. 6b shows the narrowed pseudo sync pulses and/or AGC pulses with a gap (voltage) in between. FIG. 6c shows a horizontal pulse with a raised back porch AGC pulse in typical fashion of a copy protection signal. FIGS. 6d and 6e show the result of the apparatus of FIG. 6 which narrows the raised back porch AGC pulse (FIG. 6d) and/or the horizontal sync pulse (FIG. 6e) to allow a recordable copy. Note in FIG. 6e the color burst is still present even after narrowing, in the area where burst is normally located.

Figure 7:
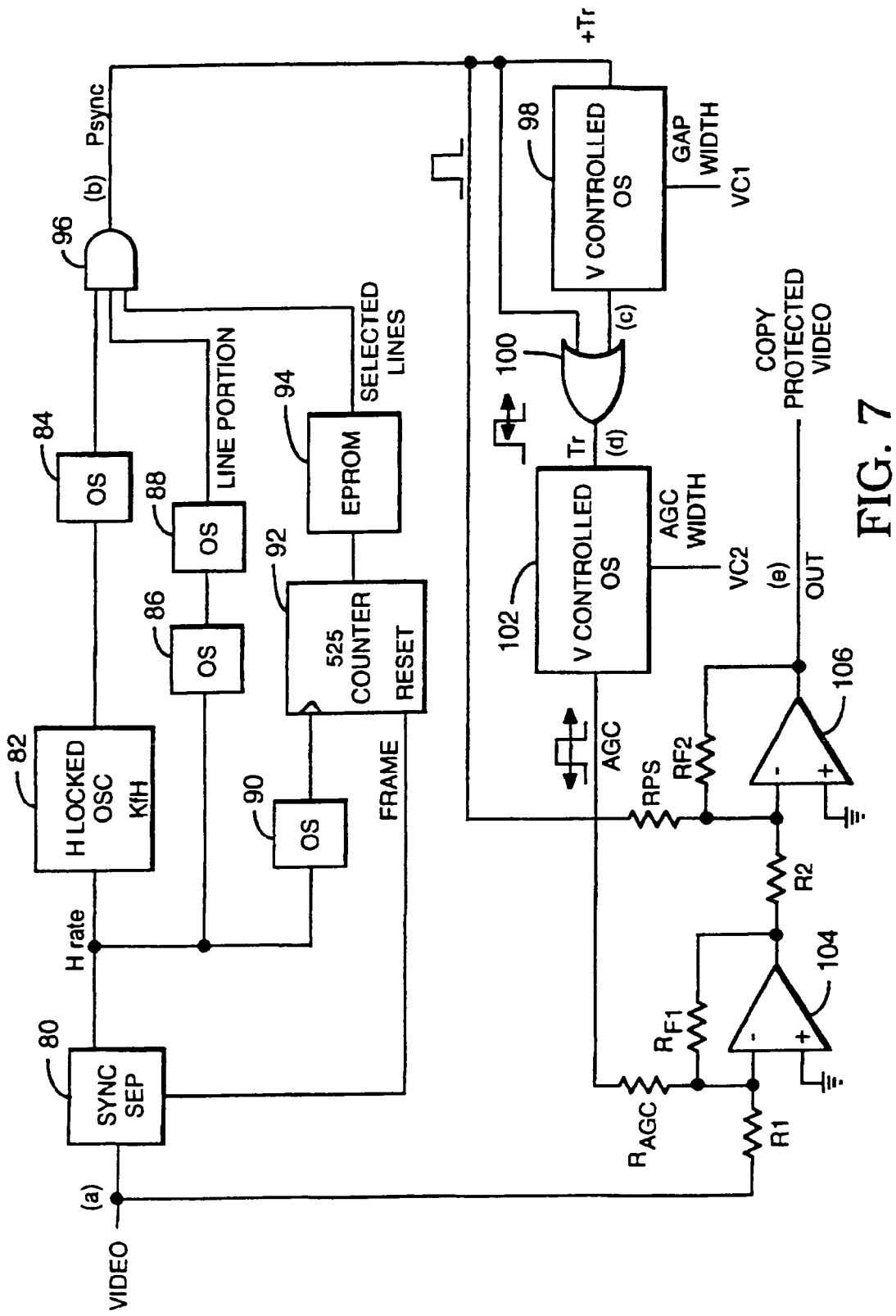
FIG. 7 illustrates copy protection apparatus of the invention that generates a dynamically variable time gap (around blanking level) between the trailing edge of pseudo sync pulses and the leading edge of AGC pulses.

FIG. 7 is a block schematic diagram depicting circuitry for generating a copy protection process of the invention that mimics the amplitude modulation of AGC pulses by position modulation. Program video with or without copy protection is the input video signal supplied at input (a) to a sync separator 80, which in turn outputs horizontal rate pulses. These horizontal rate pulses are coupled to a horizontal locked (triggered) oscillator 82. The output of this oscillator is preferably but not necessarily locked to the horizontal frequency at a higher frequency (i.e. 4 cycles per half a video line). A one shot (multivibrator) timer circuit 84 defines the positive pulse duration of the horizontal locked oscillator 82. Meanwhile, the sync separator 80 also outputs the horizontal rate pulses to a one shot 86, whose output is coupled to a one shot 88. The latter supplies a gating pulse for the location of pseudo sync pulses in the video line (i.e. 32 μseconds or first half of the video line). The location of the respective video lines that will contain the copy protection pulses is generated by a circuit consisting of a one shot 90, a (525) line counter 92 and an EPROM circuit 94. From the sync separator 80, horizontal pulses are supplied to the one shot 90 whose output is coincident with the beginning of the video line. A frame reset pulse is fed to the 525 line counter 92 (i.e. for NTSC) along with the horizontal rate pulses for the counter's clock. The counter's output is used to address the memory circuit of EPROM 94, which is programmed to output logic high pulses coincident with those video lines that will have the copy protection pulses. The output (b) of an AND gate 96 then comprises "inverted" pseudo sync pulses on selected video lines (i.e., in the vertical blanking interval).

One method for generating position modulated AGC pulses is to induce pulse width modulation on an inverted pseudo sync pulse signal and then trigger off the trailing edge of this pulse width modulated inverted pseudo sync pulse signal to generate AGC pulses. To this end, the output of AND gate 96 triggers a voltage controlled one shot timer 98 on the leading edge of an "inverted" pseudo sync pulse signal. The output (c) of one shot timer 98 is a pulse with a minimum width of the output of AND gate 96, and a maximum pulse width of 1.5 μseconds (or more) than its minimum pulse width. For example if the output of AND gate 96 has a pulse width of 2.3 μseconds, then the output of one shot timer 98 has pulse widths that vary according to voltage control VC1 from 2.3 μseconds to at least 2.3 μsecond+1.5 μseconds or at least 3.8 μseconds. The output of one shot timer 98 is OR'd by an OR gate 100 with the output of AND gate 96 to ensure that the output (d) of OR gate 100 has a minimum width of the "inverted" pseudo sync pulse from the AND gate. The output of the OR gate 100 triggers on the trailing edge to output AGC pulses whose widths can be controlled voltage wise via a voltage control VC2 supplied to a voltage controlled one shot timer 102. The output of one shot timer 102 then provides AGC pulses that are varying in delay from the pseudo sync pulses' trailing edge on the order of from zero to at least 1.5 μseconds. The output of one shot timer 102 (AGC pulses) is fed to a summing amplifier 104 along with the input video signal. The output of the inverted pseudo sync pulse from AND gate 96 is negatively summed with the output of amplifier 104 via a (negative) summing amplifier 106. The output (e) of amplifier 106 then has position modulated AGC pulses relative to the pseudo sync pulses and is thus a dynamic copy protection signal.

Note FIG. 7 illustrates that the AGC pulses also can be pulse width modulated if the one shot timer 84 is voltage controlled. FIGS. 7a to 7e show the wave forms generated at various locations (a)-(e) in the circuit of FIG. 7.

FIGS. 8a, 8b illustrate that the circuit of FIG. 7 can be applied to copy protection pulses with normal sync and raised back porch AGC pulses such as exemplified by FIG. 7a. Thus FIG. 8b shows a dynamic position modulated copy protection signal that modifies the technique of FIG. 3 of U.S. Pat. No. 4,819,098. The signal shown in FIG. 8b can occur in clusters or in selected video lines.

It should be noted that the copy protection process of the present invention can have position, pulse width and/or gap width modulation, and/or amplitude modulation, done on individual pseudo sync pulses, horizontal sync pulses, AGC pulses or raised back porch AGC pulses, over time from maximum separation (defeated copy protection) to minimum separation (full copy protection). For instance if there are 40 added pulse pairs of normal pseudo sync pulses and AGC pulses, one can in any combination slowly increase the separation between the AGC pulses and pseudo sync pulses in any number of pulse pair(s) at a time or all of them at a time until sufficient pulse pairs of copy protection pulse pairs have maximum separation to turn off copy protection. Additionally, one can in any combination slowly decrease the separation from maximum separation (defeated copy protection) to minimum separation (full copy protection).

As a further example, copy protection signals can be applied throughout the vertical blanking interval and its vicinity, and the copy protection signals can include different amounts of added pulses per video line. In one embodiment for example, a single pseudo sync pulse and/or AGC pulse in a video line can be modulated. As previously mentioned, the AGC or raised back porch AGC pulses also can be amplitude modulated in combination with the above-mentioned processes.

FIG. 9a depicts a waveform of a prior art copy protection signal. FIG. 9b depicts a waveform of a defeating or modifying method for the signal of FIG. 9a which reverses the order of at least portions of the pseudo sync and/or AGC pulses. FIG. 9c is a waveform of another method to defeat or modify the original process (FIG. 9a for example) by phase shifting, i.e., inverting, at least portions of the pseudo syncs and/or AGC pulses. In the case of FIG. 9c the phase shift is a 180 degree reversal of pseudo syncs and AGC pulses. Note that the methods described for FIGS. 9b and 9c can be applied to those copy protection pulses around or within the horizontal blanking interval. The methods described for FIGS. 9b and 9c can of course be combined with relative attenuation, pulse narrowing, level shifting, and/or position modulation copy protection defeating processes.

Also it is possible to use the techniques described for FIGS. 9b and 9c to synthesize a copy protection signal. To dynamically turn on and off the copy protection process for example, the technique starts with a copy protection signal as shown in FIG. 9a (copy protection effectively on). The technique continues for example, by slowly reversing the order of the pseudo syncs with the AGC pulses until the (modified) copy protection signal substantially becomes FIG. 9b (copy protection effectively off). Similarly, if the technique starts with FIG. 9a where the copy protection is fully on, then the copy protection process is slowly turned off by inverting (phase shifting), attenuating, level shifting and/or position modulating the pseudo syncs and/or AGC pulses until the (modified) copy protection signal becomes the signal depicted in FIG. 9c.

Figure 10:
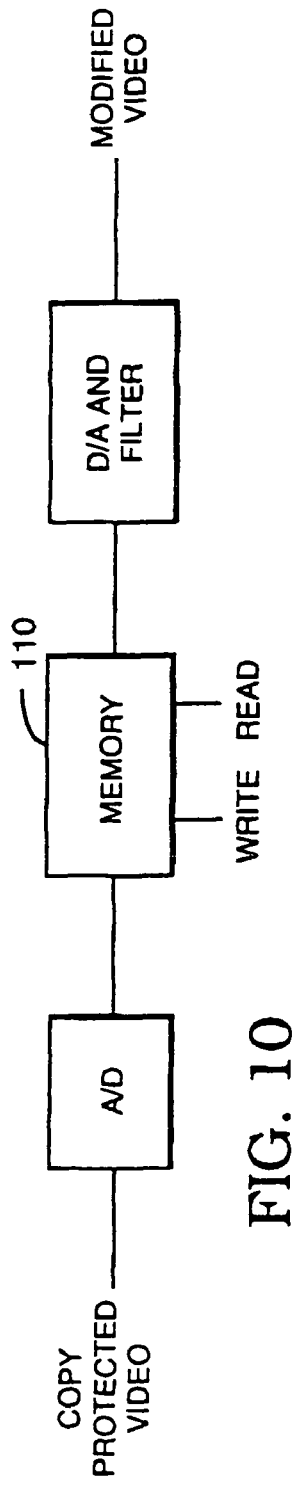
FIG. 10 is a block diagram illustrating a circuit for reversing at least portions of the pseudo sync and/or AGC pulses by way of a memory circuit.

Referring to FIG. 10, by using a video memory 110 and/or a regenerating signal, the waveform of FIG. 9a can be transformed to that of FIG. 9b. In this embodiment, the video memory 110 stores for example, the signal of FIG. 9a wherein however, the signal is read out of memory in reverse order to achieve the signal of FIG. 9b. Thus, the block diagram of FIG. 10 is an example of circuitry for implementing the latter signal reversing technique for all or selected portions of the pseudo syncs and/or AGC pulses.

Figure 11:
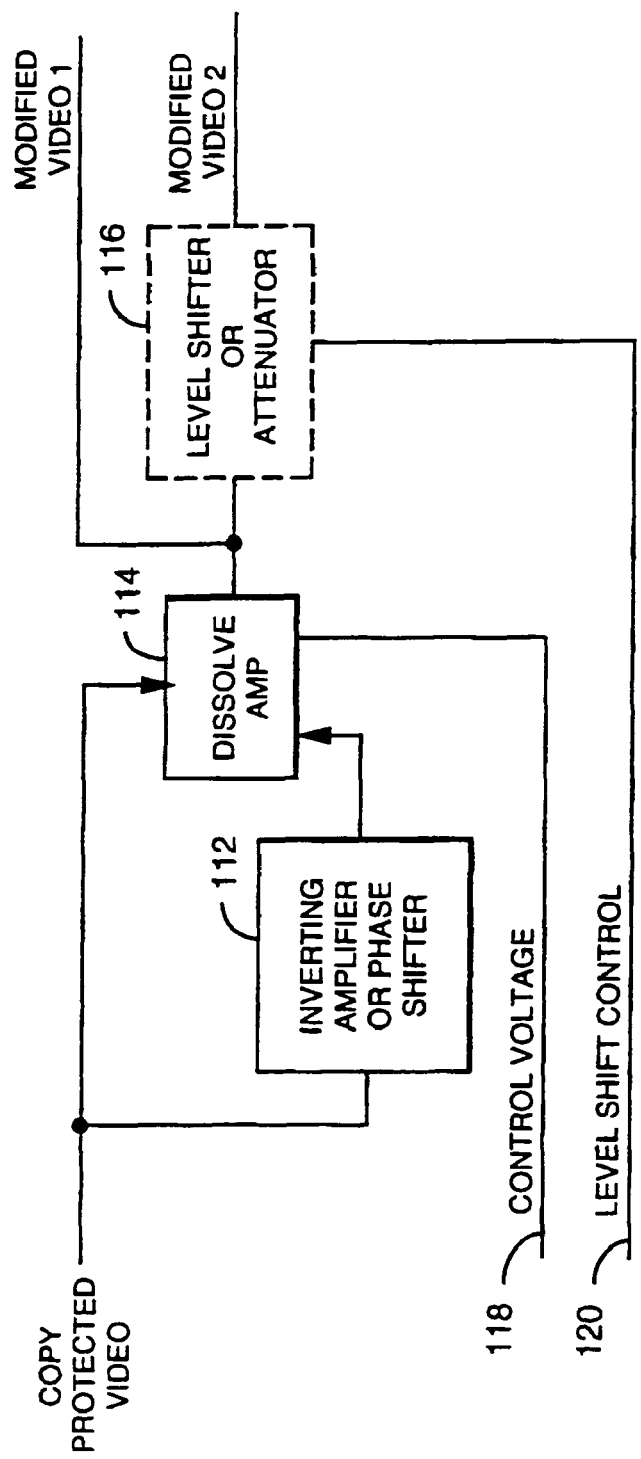
FIG. 11 is a block diagram illustrating a circuit for inverting or phase shifting portions of the pseudo syncs and/or AGC pulses by way of an inverting or phase shifting amplifier along with a switching or dissolving amplifier. An optional level shifting and/or attenuating circuit is also shown in FIG. 11.

FIG. 11 illustrates circuitry for providing the phase shifting technique of previous mention, which transforms the waveform of FIG. 9a to that of FIG. 9c. To this end, an inverting (or phase shifting) amplifier 112 inverts (phase shifts) the signal of FIG. 9a. A video mix dissolve amplifier 114 (or switcher) is used to transform or transition the waveform from that of FIG. 9a to that of FIG. 9c. The dissolve amplifier 114 is responsive to a control voltage 118. Accordingly, FIG. 11 illustrates circuitry for inverting or phase shifting at least portions of the pseudo syncs and/or AGC pulses by way of the inverting or phase shifting amplifier 112 along with the switching or dissolving amplifier 114. An optional level shifting and/or attenuating circuit 116 is also illustrated in FIG. 11 in phantom line. The level shifting/attenuating circuit 116 is responsive to a level shift control signal 120.

Although the invention has been described herein relative to specific embodiments, various additional features and advantages will be apparent from the description and drawings, and thus the scope of the invention is defined by the following claims and their equivalents.

What is claimed is:

1. A method of synthesizing copy protection signals in a video signal employing horizontal sync pulses followed by respective AGC pulses, comprising:
   replacing a portion of the horizontal sync pulse after the leading edge thereof with a selected gap voltage of selected duration to narrow the remaining portion of the horizontal sync pulse.

2. The method of claim 1 wherein the trailing edge of the narrowed horizontal sync pulse coincides with the beginning of the gap voltage of selected duration.

3. The method of claim 1 wherein the gap voltage duration between the narrowed horizontal sync pulse and the respective AGC pulse may change over time.

4. The method of claim 1 wherein the selected gap voltage is amplitude modulated.

* * * * *